(12) United States Patent
Fukushima et al.

(10) Patent No.: US 7,913,614 B2
(45) Date of Patent: Mar. 29, 2011

(54) MILK FOAMER

(75) Inventors: Naoto Fukushima, Tatebayashi (JP); Hiroshi Yamamoto, Gyoda (JP); Takeshi Ishii, Fukaya (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 771 days.

(21) Appl. No.: 11/790,138

(22) Filed: Apr. 24, 2007

(65) Prior Publication Data

US 2007/0251459 A1   Nov. 1, 2007

(30) Foreign Application Priority Data

May 1, 2006   (JP) ................................. 2006-127586

(51) Int. Cl.
*A47J 31/44* (2006.01)

(52) U.S. Cl. ........ 99/323.1; 99/452; 99/453; 134/22.11; 261/DIG. 76

(58) Field of Classification Search ..................... 99/293, 99/323.1, 286, 453, 452; 134/22.12, 22.11; 261/DIG. 76

See application file for complete search history.

(56) References Cited

U.S. PATENT DOCUMENTS

| | | | | |
|---|---|---|---|---|
| 6,019,032 | A * | 2/2000 | Arksey | 99/452 |
| 6,959,642 | B1 * | 11/2005 | Landolt | 99/455 |
| 7,448,314 | B2 * | 11/2008 | Ioannone et al. | 99/452 |
| 7,475,628 | B2 * | 1/2009 | Lussi | 99/286 |
| 2006/0174778 | A1 * | 8/2006 | Greiwe | 99/453 |
| 2009/0114099 | A1 * | 5/2009 | Gotlenboth | 99/288 |
| 2009/0158937 | A1 * | 6/2009 | Stearns et al. | 99/280 |

FOREIGN PATENT DOCUMENTS

JP   2005-73868   3/2005

* cited by examiner

*Primary Examiner* — Reginald L Alexander
(74) *Attorney, Agent, or Firm* — Kratz, Quintos & Hanson, LLP

(57) ABSTRACT

An object is to provide a milk foamer capable of smoothly and securely managing hygiene of a suction tube which sucks milk from a milk storage section. The milk foamer sucks the milk from a milk pack via the suction tube and mixes the milk and air with the milker to produce milk foam. The milk foamer includes a control unit which controls the production of the milk foam, and a cleaning unit which executes a cleaning operation of a route extending from the suction tube to the milker. The control unit prohibits the production of the milk foam and instructs the cleaning unit to execute the cleaning operation, in a case where a predetermined time elapses from the previous production of the milk foam.

12 Claims, 12 Drawing Sheets

MILK FOAMER

TECHNICAL FIELD

The present invention relates to a milk foamer which mixes milk and air in a milker to produce milk foam.

BACKGROUND

Heretofore, a beverage manufacturing device of a tea, a coffee or the like is constituted so that the manufactured tea, coffee or the like can be accompanied with milk foam produced by a milk foamer. This milk foamer sucks milk into the milker from a milk pack (a milk storage section) in which the milk is stored via a suction tube by use of steam generated by a boiler. On the other hand, air is simultaneously sucked into the milker, and this milker mixes the milk and the air to produce the milk foam (see, e.g., Japanese Patent Application Laid-Open No. 2005-73868).

However, when the milk is sucked from the milk pack, a slight amount of the milk is attached to an inner surface of the suction tube, and remains. If this remaining milk is left to stand for a predetermined time or more, floating germs present in the air are attached to the milk to multiply. Moreover, a problem has occurred that the miscellaneous germs which have multiplied in the suction tube are mixed in the tea or the coffee during the next production of the milk foam.

The present invention has been developed in order to solve such a conventional technical problem, and an object thereof is to provide a milk foamer capable of smoothly and securely managing hygiene of a suction tube which sucks milk from a milk storage section.

SUMMARY

A milk foamer of a first invention sucks milk from a milk storage section via a suction tube and mixes the milk and air in a milker to produce milk foam, comprising: a control unit which controls the production of the milk foam; and a cleaning unit which executes a cleaning operation of a route extending from the suction tube to the milker, the control unit being configured to prohibit the production of the milk foam and instruct the cleaning unit to execute the cleaning operation, in a case where a predetermined time elapses from the previous production of the milk foam.

The milk foamer of a second invention is characterized in that the above control unit cancels the prohibition of the production of the milk foam after end of the cleaning operation by the cleaning unit.

The milk foamer of a third invention is characterized in that in the above inventions, the cleaning unit has a cleaning liquid storage section in which a predetermined cleaning liquid is stored and a connecting section which is connected to an end portion of the suction tube on a milk storage section side, and during the cleaning operation, the control unit allows the cleaning liquid to be sucked into the suction tube from the cleaning liquid storage section of the cleaning unit in a state in which the end portion of the suction tube is connected to the connecting section.

The milk foamer of a fourth invention is characterized in that during the cleaning operation, the control unit allows rinsing water to be sucked into the suction tube from the cleaning unit after the suction of the cleaning liquid.

The milk foamer of a fifth invention is characterized in that during the cleaning operation of the third or fourth invention, the control unit executes an operation of sucking the air into the suction tube after the suction of the cleaning liquid, or the cleaning liquid and the rinsing water.

The milk foamer of a sixth invention comprises a boiler which generates steam in the second to fifth inventions, and is characterized in that the milk foamer sucks the milk from the milk storage section via the suction tube by the steam generated by this boiler, and sucks the cleaning liquid, or the cleaning liquid and the rinsing water into the suction tube from the cleaning unit by the steam generated by the boiler during the cleaning operation.

According to the first invention, the milk foamer sucks the milk from the milk storage section via the suction tube and mixes the milk and the air with the milker to produce the milk foam. The milk foamer includes the control unit which controls the production of the milk foam and the cleaning unit which executes the cleaning operation of the route extending from the suction tube to the milker. The control unit is configured to prohibit the production of the milk foam and instruct the cleaning unit to execute the cleaning operation, in the case where the predetermined time elapses from the previous production of the milk foam. Therefore, when the cleaning unit executes the cleaning operation based on the instruction, it is possible to smoothly and securely prevent a disadvantage that miscellaneous germs multiply in the milk remaining in the suction tube which sucks the milk from the milk storage section and the milker.

Moreover, according to the second invention, in addition to the above invention, the control unit cancels the prohibition of the production of the milk foam after the end of the cleaning operation by the cleaning unit. In consequence, after the cleaning operation, the production of the milk foam can be restarted without any trouble.

Furthermore, according to the third invention, in addition to the above inventions, the cleaning unit has the cleaning liquid storage section in which the predetermined cleaning liquid is stored and the connecting section connectable to the end portion of the suction tube on the milk storage section side. Moreover, during the cleaning operation, the control unit allows the cleaning liquid to be sucked into the suction tube from the cleaning liquid storage section of the cleaning unit in the state in which the end portion of the suction tube is connected to the connecting section. In consequence, the milk remaining in the route extending from the suction tube to the milker can smoothly be cleaned with the cleaning liquid.

In addition, according to the fourth invention, during the above cleaning operation, the control unit allows the rinsing water to be sucked into the suction tube from the cleaning unit after the suction of the cleaning liquid. Therefore, the cleaning liquid used during cleaning can smoothly be washed away from the route extending from the suction tube to the milker. A disadvantage that the cleaning liquid is mixed during the next production of the milk foam can be avoided.

Moreover, according to the fifth invention, during the cleaning operation of the third or fourth invention, the control unit executes the operation of sucking the air into the suction tube after the suction of the cleaning liquid, or the cleaning liquid and the rinsing water. Therefore, the cleaning liquid and the rinsing water attached to the route extending from the suction tube to the milker can be blown off. A disadvantage that the liquid and the water are mixed into the milk foam can securely be prevented.

According to the sixth invention, in addition to the second to fifth inventions, the milk foamer further comprises the boiler which generates the steam. The milk foamer sucks the milk from the milk storage section via the suction tube by the steam generated by this boiler, and sucks the cleaning liquid, or the cleaning liquid and the rinsing water into the suction tube from the cleaning unit by the steam generated by the boiler during the cleaning operation. In consequence, the cleaning liquid and the rinsing water can be sucked by use of the boiler for producing the milk foam, and the number of components and manufacturing costs can be reduced.

DETAILED DESCRIPTION OF THE EMBODIMENT

Figure 1:
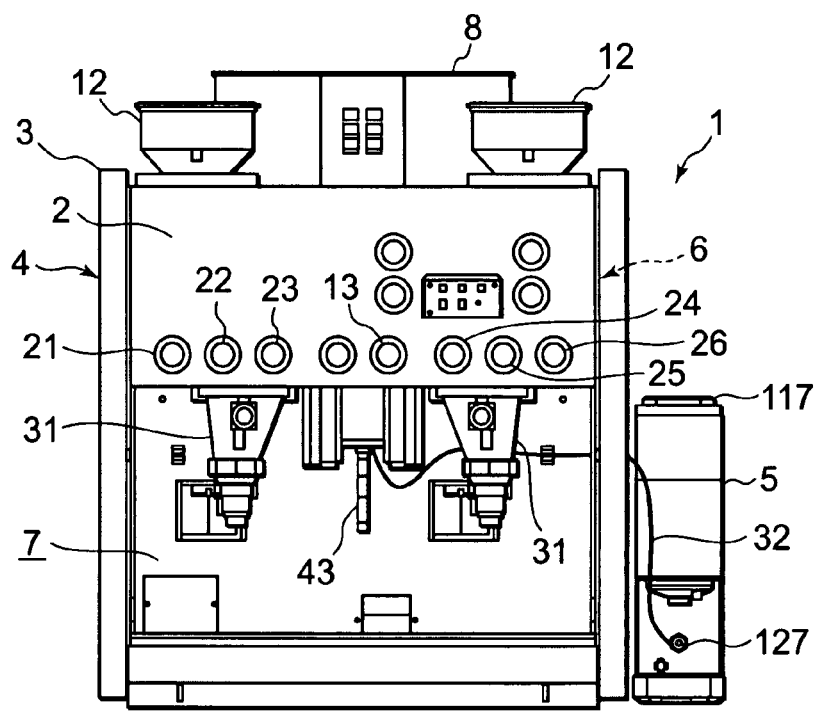
FIG. 1 is a front view of a beverage manufacturing device as an embodiment to which a milk foamer of the present invention is applied.
Figure 2:
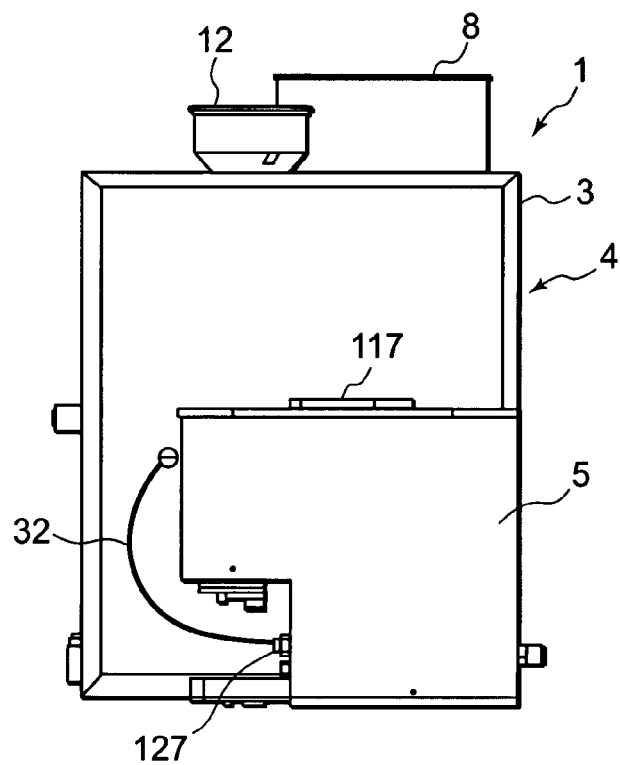
FIG. 2 is a side view of the beverage manufacturing device of FIG. 1.
Figure 3:
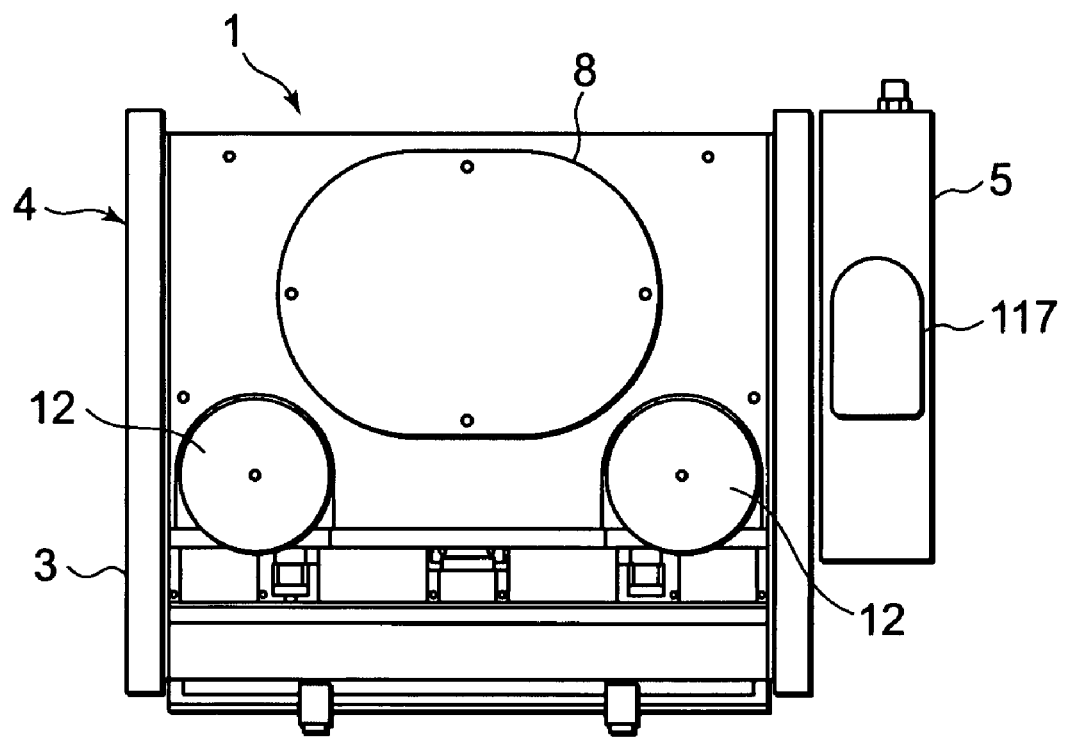
FIG. 3 is a plan view of the beverage manufacturing device of FIG. 1.

An embodiment of the present invention will hereinafter be described in detail with reference to the drawings. It is to be noted that a beverage manufacturing device 1 of the embodiment is used in extracting and serving each cup of tea beverage, and can be applied to tea beverages such as a red tea and the Chinese tea in addition to the Japanese tea (green teas: a natural leaf tea and a powdered green tea) as a main application.

In the beverage manufacturing device 1 of the embodiment, a main body 4 is constituted of a rectangular case 3. A unit chamber 6 is constituted so as to extend from an upper part to a rear part of this main body 4, and a front panel 2 openably closes a front surface of an upper part of this unit chamber 6. Moreover, a tea supply chamber 7 which opens forwards is constituted under the unit chamber 6 of this upper part. A hot water tank unit 8 constituting hot water supply means is attached to a rear part of the center of a top surface of the main body 4. A predetermined amount of high-temperature water is generated and stored in this hot water tank unit 8. A cleaning unit 5 constituting a milk foamer 41 of the present invention is attached to a side surface of the case 3.

A pair of leaf tea canisters (leaf tea storage means) 12, 12 are attached to left and right parts of the top surface of the main body 4 in front of this hot water tank unit 8. In both of the leaf tea canisters 12, 12, a predetermined amount of leaf tea such as the natural leaf tea, refined green tea or a mixture of them is stored. On left and right parts of the front panel 2, sales buttons 21, 22 and 23, and 24, 25 and 26 are arranged, respectively, which are selected and operated during extracting of the tea beverage and supplying of hot water, and a cleaning button 13 is disposed between the sales buttons.

Figure 4:
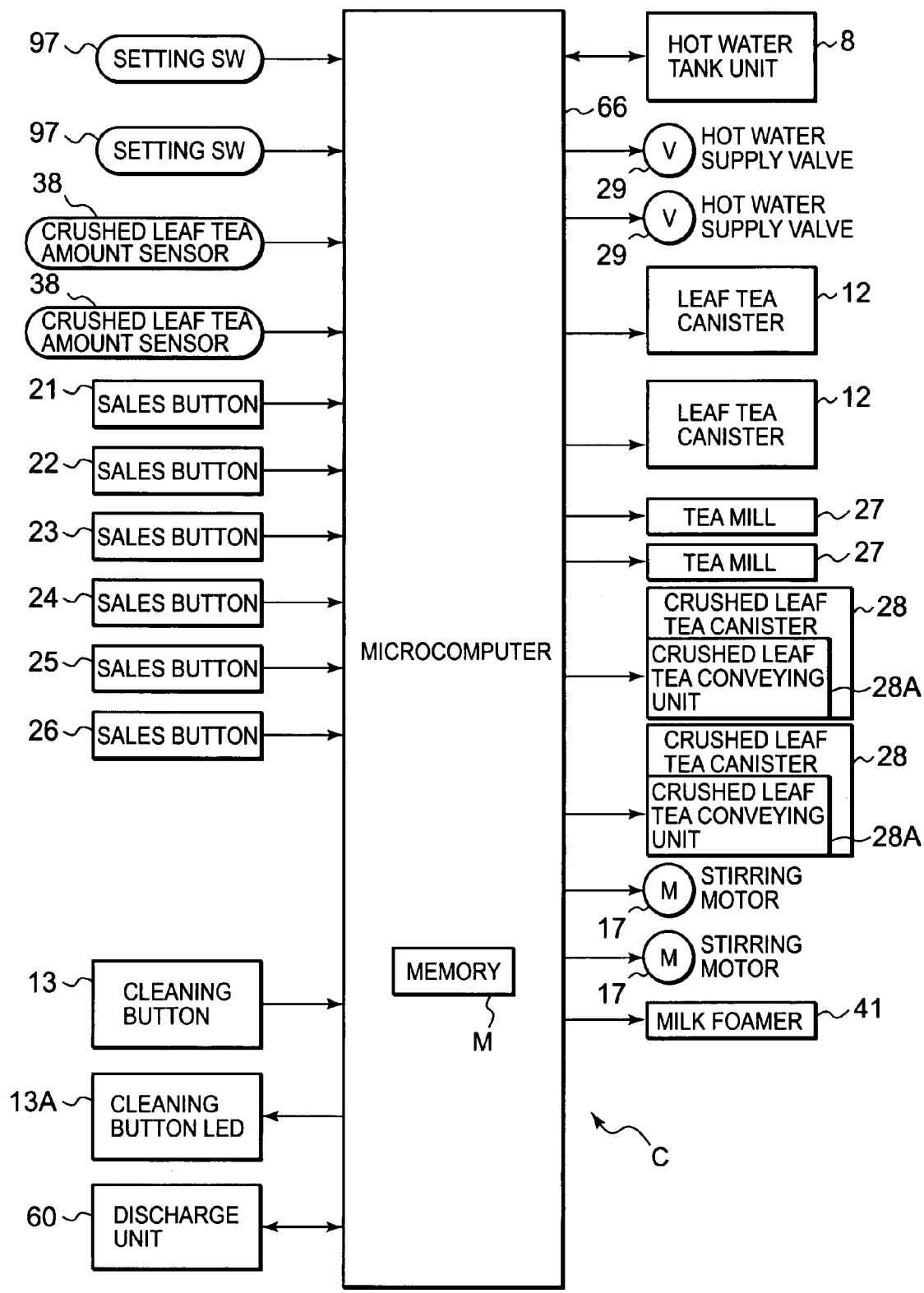
FIG. 4 is a block diagram showing a control unit of the beverage manufacturing device of FIG. 1.

On the left and right sides in the unit chamber 6 constituting the upper part of the main body 4, tea mills 27, 27 (shown in FIG. 4), crushed leaf tea canisters 28, 28 (these tea mills 27 and crushed leaf tea canisters 28 constitute crushing means as shown in FIG. 4), stirring motors 17, 17 (shown in FIG. 4) constituted of brushless DC motors which rotate stirring blades (not shown), and hot water supply valves 29, 29 (shown in FIG. 4) are arranged, respectively. Moreover, the left and right tea mills 27, 27 correspond to lower parts of the left and right leaf tea canisters 12, 12, and the left and right crushed leaf tea canisters 28, 28 correspond to inner parts of the left and right tea mills 27, 27.

Moreover, annular attachment frames to which extraction vessels (extraction means) 31, 31 are detachably attached are arranged on left and right parts of a lower surface of the unit chamber 6 constituting the upper part of the main body 4, respectively. The left and right stirring motors 17, 17 and the left and right hot water supply valves 29, 29 correspond to inner upper parts of the left and right attachment frames.

The left and right tea mills 27, 27 are attached to lower end portions of the left and right leaf tea canisters 12, 12, and structured so that the leaf tea directly drops down and is supplied from the leaf tea canisters 12, 12 to the tea mills 27, 27. Both of the tea mills 27, 27 include finely cutting blades and hand mills. After finely cutting the leaf tea supplied from the leaf tea canisters 12, 12, the tea is milled with the hand mills. In consequence, crushed leaf tea having predetermined particle diameters (of about 30 microns) is produced (here, a usual particle diameter of the powdered green tea is about ten microns). It is to be noted that crushed particle sizes of the leaf tea in these tea mills 27, 27 are adjustable, and the finely cutting blades are replaceable.

Moreover, the crushed leaf tea crushed by the left and right tea mills 27, 27 is introduced and stored in the left and right crushed leaf tea canisters 28, 28. The left and right crushed leaf tea canisters 28, 28 are provided with crushed leaf tea conveying units 28A, 28A (FIG. 4) constituted of spiral augers, respectively. The crushed leaf tea conveying units 28A, 28A supply the crushed leaf tea from the left and right crushed leaf tea canisters 28, 28 to the left and right extraction vessels 31, 31, respectively. It is to be noted that the crushed leaf tea canisters 28, 28 are provided with crushed leaf tea amount sensors 38, 38 (FIG. 4) which detect an amount of the crushed leaf tea stored in the canisters, respectively.

Figure 5:
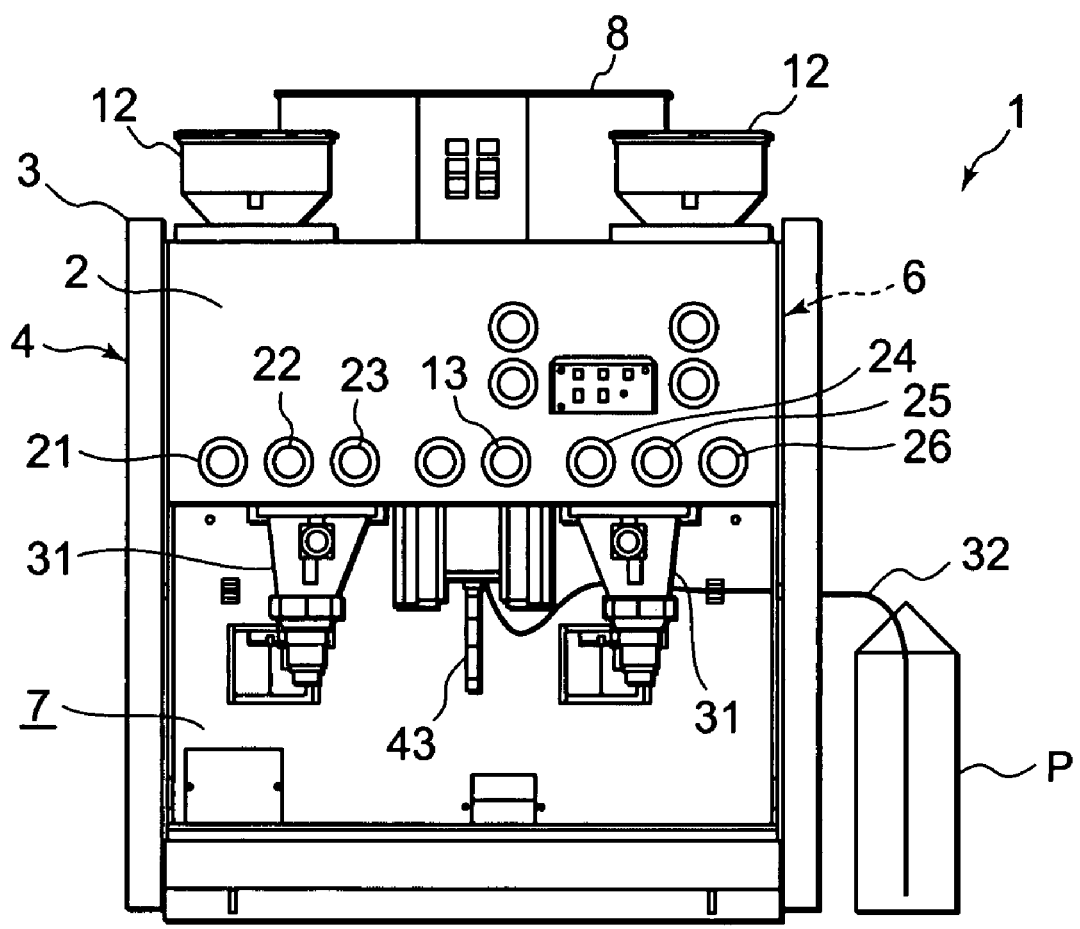
FIG. 5 is a front view of the beverage manufacturing device of FIG. 1 in a state during selling of a tea beverage.
Figure 6:
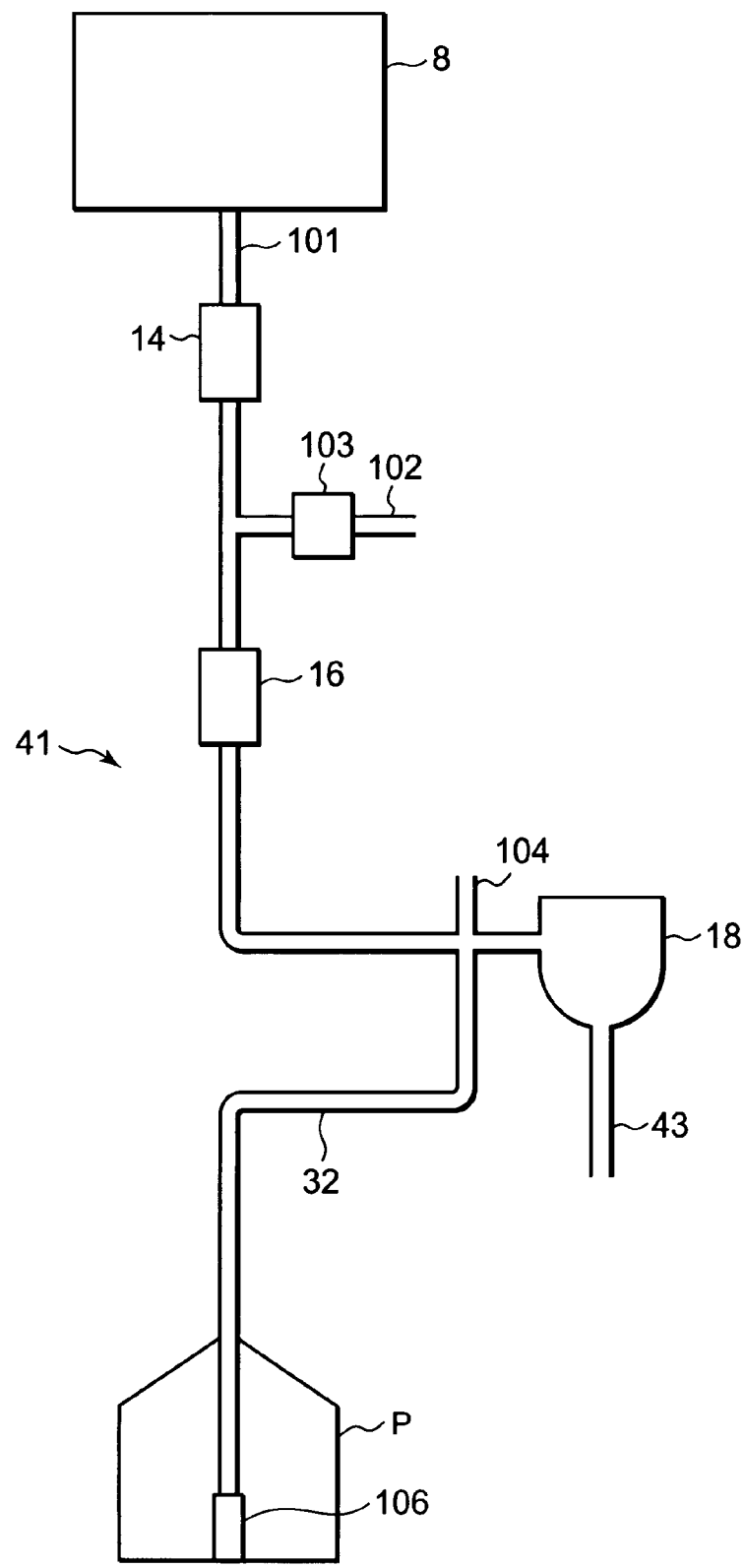
FIG. 6 is a constitution diagram of the inside of a main body showing the milk foamer of the beverage manufacturing device shown in FIG. 1.
Figure 7:
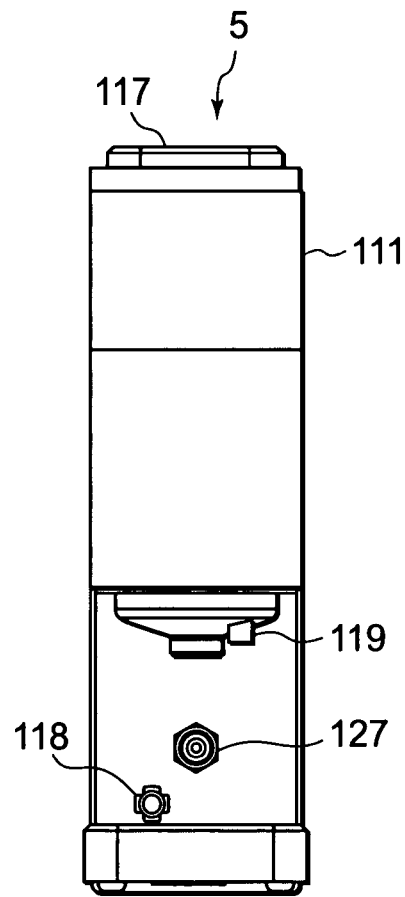
FIG. 7 is a front view of a cleaning unit shown in FIG. 1.
Figure 8:
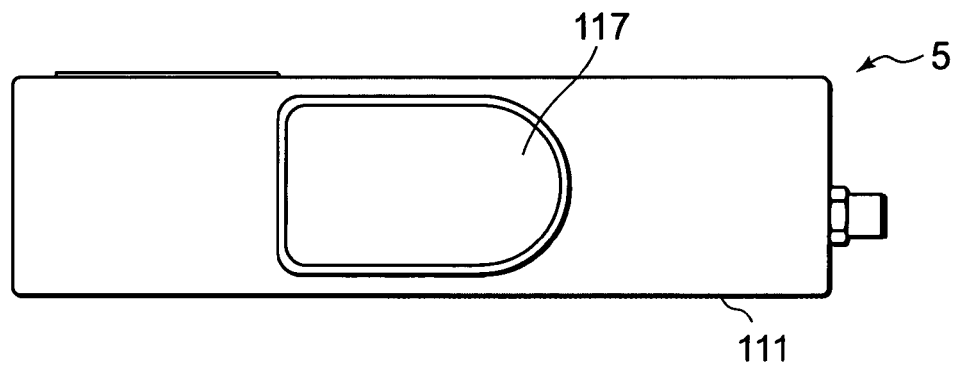
FIG. 8 is a plan view of the cleaning unit of FIG. 7.
Figure 9:
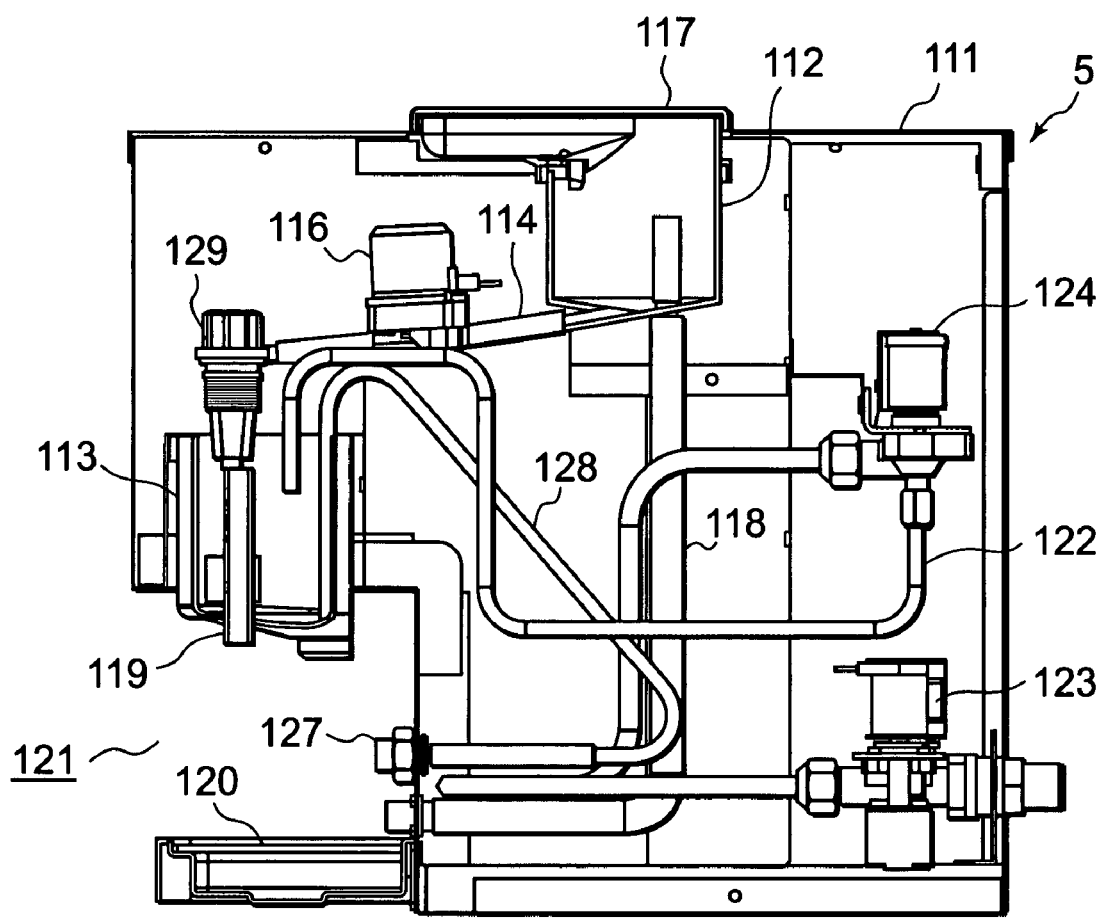
FIG. 9 is an inner constitution diagram of the cleaning unit of FIG. 7.
Figure 10:
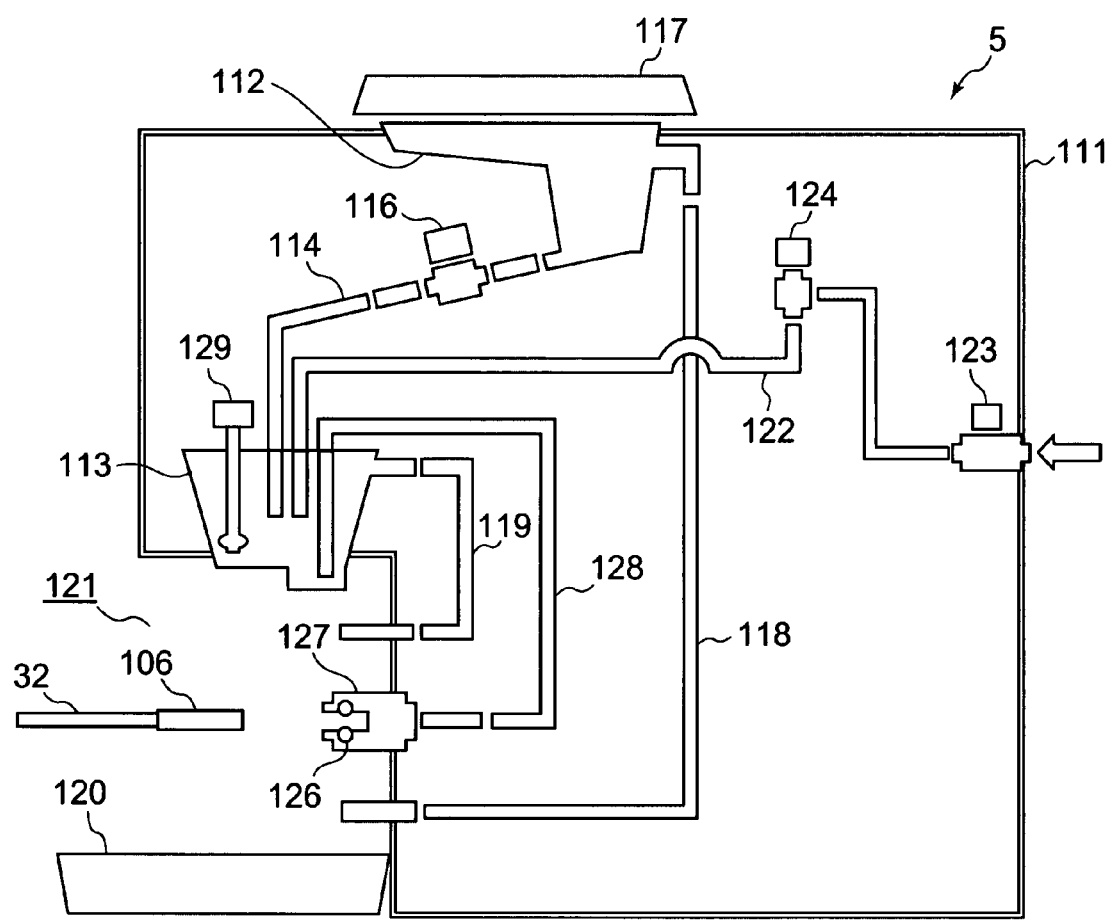
FIG. 10 is a piping constitution diagram in the cleaning unit of FIG. 7.

Furthermore, the milk foamer 41 of the present invention is disposed in the unit chamber 6 constituting the rear part of the main body 4. FIG. 5 is a front view of the beverage manufacturing device 1 in a state during selling of a tea beverage, and FIG. 6 is a constitution diagram of the inside of the main body 4 showing the milk foamer 41 of the beverage manufacturing device 1. It is to be noted that FIG. 5 does not show the cleaning unit 5. In actual, the cleaning unit is positioned behind a milk pack P of FIG. 5.

As shown in FIG. 6, the milk foamer 41 of the embodiment includes a hot water supply piping 101 which takes the hot water out of the hot water tank unit 8, an electromagnetic pump 14, a steam boiler 16, a milker 18, a milk foam nozzle 43, a suction tube 32 and the like. One end of the hot water supply piping 101 is connected to the hot water tank unit 8, and the piping is successively provided with the electromagnetic pump 14 and the steam boiler 16. Moreover, the other end of the hot water supply piping 101 is connected to the milker (a mixing section) 18. The hot water supply piping 101 positioned between the electromagnetic pump 14 and the steam boiler 16 is provided with a branched piping 102. This branched piping 102 is provided with a valve unit 103 which opens to the outside at a predetermined pressure.

The steam boiler 16 contains a heater (not shown). The boiler heats the hot water supplied from the hot water tank unit 8 via the hot water supply piping 101 and the electromagnetic pump 14 to raise a temperature of the water to, for example, +170° C., generates steam and supplies this generated steam to the milker 18. The steam boiler 16 is provided with a temperature sensor (not shown), and a microcomputer 66 of a control unit C performs temperature control so as to obtain a steam temperature set based on a temperature detected by this temperature sensor. Furthermore, the hot water supply piping 101 extending from a downstream side of this steam boiler 16 to the milker 18 is provided with a thermal insulation tube (not shown) which inhibits leakage of heat from the steam boiler 16.

The milker 18 substantially has a cylindrical shape, and the milk foam nozzle 43 which discharges milk foam produced in the milker is attached to a bottom surface of the milker. The hot water supply piping 101 is connected to a side surface of the milker 18 at a position deviating from the center of a cylinder constituting the milker, and the piping slightly protrudes into the milker. One end of the suction tube 32 is connected to a portion (in actual, a separate member to be connected to a tube or a nozzle is attached to this portion) of the hot water supply piping 101 before connected to the milker 18. Furthermore, an air suction nozzle 104 is connected to a surface of the hot water supply piping which faces the suction tube.

A weight member 106 is attached to the other end (an end portion on a milk pack P side) of the suction tube 32, and this other end is inserted into the milk pack P as a milk storage section. It is to be noted that this milk pack P is insulated so as to be cold by a cold insulation unit (not shown). In the embodiment, the weight member 106 having a weight of about 20 g is employed in order to sink the suction tube 32 into a lower part of the milk pack P. Moreover, cutouts are formed from a bottom surface to a side surface of the weight member 106, and the member is constituted so as to be capable of sucking even milk remaining on the bottom surface of the milk pack P.

Moreover, a small hole is formed in the air suction nozzle 104. In this constitution, a small amount of air can be sucked into the nozzle at once. When the steam generated by the steam boiler 16 enters the milker, the air is sucked from the atmosphere via the air suction nozzle 104, and the milk is simultaneously sucked from the milk pack P via the suction tube 32 to mix the air and the milk. This mixture is foamed and discharged from the milk foam nozzle 43. This milk foam nozzle 43 is disposed at the center of a lower surface of the unit chamber 6 constituting the upper part of the main body 4 so as to be rotatable counterclockwise and clockwise. The milk foam nozzle can rotate to supply the milk foam to cups disposed at predetermined tea supply positions in the tea supply chamber 7 under the left and right extraction vessels (extraction means) 31, 31, respectively.

Next, in FIG. 4, the control unit C is constituted of the general-purpose microcomputer 66. Outputs of this microcomputer 66 are connected to the above hot water tank unit 8, the hot water supply valves 29, 29, the tea mills 27, 27, the crushed leaf tea conveying units 28A, 28A, the stirring motors 17, 17, the milk foamer 41 having the cleaning unit 5, a cleaning button LED 13A constituted of an LED incorporated in the cleaning button 13 to emit multicolor light (two colors of green and orange in the embodiment) and the like. Inputs of the microcomputer 66 are connected to setting switches 97, 97 which detect that the extraction vessels 31, 31 have been attached to the left and right attachment frames, the crushed leaf tea amount sensors 38, 38, the sales buttons 21 to 26, the cleaning button 13, a discharge unit 60 which automatically discharges the extracted tea beverage from the extraction vessel 31 and the like.

In a memory M of this microcomputer 66, data concerning an amount of warm water, the amount and presence of the crushed leaf tea and presence of the milk foam can be set for each of the sales buttons 21 to 26 by use of a key switch (not shown).

Next, the cleaning unit 5 constituting the milk foamer 41 of the present invention will be described with reference to FIGS. 7 to 10. In an upper part of an exterior case 111 of the cleaning unit 5, a cleaning liquid tank 112 is disposed in which hypochlorous acid (HClO) is stored as an example of a cleaning liquid. In a front part of the exterior case, a liquid storage tank 113 is disposed as a cleaning liquid storage section. A cleaning liquid pipe 114 extends from the cleaning liquid tank 112 to open at the liquid storage tank 113. This cleaning liquid pipe 114 is provided with a cleaning liquid electromagnetic valve 116.

It is to be noted that reference numeral 117 is a lid to openably close an opening in an upper surface of the cleaning liquid tank 112 which opens at a top surface of the exterior case 111. Moreover, reference numeral 118 is an overflow nozzle of the cleaning liquid tank 112, 119 is an overflow nozzle of the liquid storage tank 113, and the nozzles open at a connection space 121 constituted as a depressed concave lower part of a front surface of the cleaning unit 5 under the liquid storage tank 113. It is to be noted that reference numeral 120 is a drip tray (a waste water receptacle) disposed under the connection space 121.

In the liquid storage tank 113, a water supply pipe 122 opens which supplies tap water for use as rinsing water, and this water supply pipe 122 is provided with two water supply electromagnetic valves 123, 124. At the connection space 121, a tube holder 127 is disposed as a connecting section including an O-ring 126. This tube holder 127 is connected to a suction pipe 128 which opens at a bottom part of the liquid storage tank 113. A water level sensor 129 including a float switch is attached to the inside of the liquid storage tank 113 to detect a water level of the cleaning liquid or the rinsing water of the liquid storage tank 113.

The electromagnetic valves 116, 123 and 124 are controlled by the microcomputer 66. The water level of the liquid storage tank 113 detected by the water level sensor 129 is input into the microcomputer 66. The lid 117 is opened to introduce a predetermined amount of the cleaning liquid (an aqueous solution of hypochlorous acid) into the cleaning liquid tank 112 immediately before a cleaning operation is performed as described later. Moreover, during the cleaning operation described later, the microcomputer 66 opens the cleaning liquid electromagnetic valve 116 to supply the cleaning liquid from the cleaning liquid tank 112 to the liquid storage tank 113 via the cleaning liquid pipe 114. In a case where the water level sensor 129 detects that the water level (the cleaning liquid) of the liquid storage tank 113 has reached a full water level, the microcomputer 66 closes the cleaning liquid electromagnetic valve 116. The microcomputer 66 opens the water supply electromagnetic valves 123, 124 to supply the rinsing water (the tap water) into the liquid storage tank 113 via the water supply pipe 122. When the water level sensor 129 detects that the water level (the rinsing water) of the liquid storage tank 113 has reached the full water level, the microcomputer 66 closes the water supply electromagnetic valves 123, 124.

An operation of the beverage manufacturing device 1 of the embodiment constituted as described above will be described.

(1) Manufacturing of Tea Beverage

The extraction vessels 31, 31 are attached to the left and right attachment frames. Moreover, when power supply is turned on, the microcomputer 66 generates and stores the high-temperature water in the hot water tank unit 8 as described above. The tea mills 27, 27 are driven to crush the leaf tea which has dropped down from the leaf tea canisters 12, 12 by the tea mills 27, 27 as described above. The crushed leaf tea produced by the tea mills 27, 27 are stored in the crushed leaf tea canisters 28, 28, respectively. When the crushed leaf tea amount sensors 38, 38 detect the predetermined amount (an upper limit value) of the crushed leaf tea, the driving of the corresponding tea mill 27 is stopped.

It is to be noted that, in a case where the crushed leaf tea is taken out of the crushed leaf tea canisters 28, 28 as described later and the amount of the crushed leaf tea decreases to a lower limit value, the microcomputer 66 again drives the tea mills 27, 27 based on outputs of the crushed leaf tea amount sensors 38, 38, and the crushed leaf tea canisters 28, 28 are replenished with the crushed leaf tea. Moreover, when the canisters are similarly replenished with the predetermined amount (the upper limit value) of the tea, the tea mills 27, 27 stop. Moreover, when such preparation of the warm water and the crushed leaf tea is completed, the tea can be sold.

Moreover, for example, when the powdered green tea is sold, the cup is set at the tea supply position under the extraction vessel 31 on the right as one faces before operating the sales button 26. The microcomputer 66 supplies the hot water from the hot water tank unit 8 to the extraction vessel 31 based on data concerning the sales button 26 set in the memory M. Furthermore, the microcomputer controls the crushed leaf tea conveying unit 28A of the right crushed leaf tea canister 28 to supply a large amount of the crushed leaf tea into the extraction vessel 31 from the crushed leaf tea canister 28.

In the extraction vessel 31, a component extracted from the supplied crushed leaf tea leaches out in the warm water. At this time, since the leaf tea is crushed, a contact area between the tea and the warm water increases. Therefore, the extracted component leaches out quickly. Especially, since a large amount of the crushed leaf tea and the hot water (setting of a low temperature is preferable) are supplied, a very strong tea beverage (the powdered green tea) is produced in the extraction vessel 31. Moreover, the microcomputer 66 intermittently operates the right stirring motor 17, and intermittently rotates a stirring blade (not shown) to stir the tea beverage in the extraction vessel 31. In consequence, a large amount of foam is produced in the tea beverage of the extraction vessel 31.

Here, when the crushed leaf tea is formed into superfine or extremely micro particles, the crushed leaf tea is homogenized with water molecules (the warm water) and mildly liquefied without being separated from the water (the warm water). In consequence, a mild taste can be produced without being so-called powdery. According to such a constitution, all of nutritious elements of the tea can be taken as foods. Moreover, the extracted and much foamed powdered green tea is discharged from a discharge port at a lower end of the extraction vessel 31 by the discharge unit 60, and poured into the cup disposed under the port.

(2) Manufacturing of Coffee

Next, when a coffee is manufactured, a shower nozzle (not shown) is attached to the attachment frame on the left as one faces. A stirring blade for the coffee is also attached to the stirring motor 17. Moreover, a dripper and a paper filter (not shown) are disposed in the extraction vessel 31 on the left as one faces, and a predetermined amount of coffee material powder is introduced. Furthermore, the extraction vessel 31 is set at the attachment frame on the left as one faces, the cup is set at the tea supply position under the extraction vessel 31, and the sales button 21 is operated.

The microcomputer 66 supplies the hot water into the extraction vessel 31 from the hot water tank unit 8 based on the data concerning the sales button 21 set in the memory M. Since the warm water is scattered all over the coffee material powder in the dripper from the shower nozzle, a coffee liquid is smoothly extracted from the material powder. Even during this extraction, the microcomputer 66 allows the stirring motor 17 to rotate the stirring blade at a speed suitable for the coffee.

At this time, when the lower-end discharge port of the extraction vessel 31 is opened by the discharge unit 60 beforehand, the extracted coffee is gradually pored into the cup disposed under the port. On the other hand, in a case where the discharge port of the extraction vessel 31 is closed, so-called drip-on extraction can be performed to extract the coffee in a state in which the warm water and the material powder are accumulated in the dripper, When this drip-on is performed, a stronger coffee can be extracted. In this case, after the extraction for a predetermined time, the strong coffee is poured into the cup.

(3) Production of Milk Foam

Next, for example, when powdered green tea milk is sold, the cup is set at the tea supply position under the extraction vessel 31 on the right as one faces, and the sales button 25 is operated. The milk foam nozzle 43 is rotated to open above the cup at the tea supply position under the right extraction vessel 31.

Based on the data concerning the sales button 25 set in the memory M, the microcomputer 66 supplies the hot water into the extraction vessel 31 from the hot water tank unit 8, and controls the crushed leaf tea conveying unit 28A of the right crushed leaf tea canister 28 to supply a small amount of the crushed leaf tea into the extraction vessel 31 from the crushed leaf tea canister 28. In this case, an extracted tea liquid stored in the extraction vessel 31 may arbitrarily be stirred by the stirring blade. Moreover, after the stirring is performed for an arbitrary time, the discharge unit 60 pours the extracted liquid of the extraction vessel 31 into the cup disposed under the vessel.

On the other hand, the microcomputer 66 produces the milk foam with the milk foamer 41. An operation in this case will be described. In a case where the milk foam is produced by the milk foamer 41, the microcomputer 66 operates the electromagnetic pump 14 for a predetermined time of, for example, ten seconds. In consequence, the hot water stored in the hot water tank unit 8 is discharged into the hot water supply piping 101, and the discharged hot water enters the steam boiler 16. The hot water supplied into the steam boiler 16 is further heated by the steam boiler 16 at a temperature suitable for the production of the milk foam, for example, +170° C., and formed into the steam.

Moreover, the steam generated by the steam boiler 16 is jetted into the milker 18 from the hot water supply piping 101 connected to this steam boiler 16 on a downstream side. Here, when the steam passes through one end of the suction tube 32 in the vicinity of the air suction nozzle 104, a negative pressure is generated. Therefore, the milk stored in the milk pack P is sucked from the suction tube 32, and outside air is sucked from the air suction nozzle 104. Moreover, the sucked milk and air are discharged into the milker 18. Here, the milk and the air discharged into the milker 18 circulate along an inner wall of the milker 18 by the pressure of the steam. During this circulation, the milk and the air are mixed, brought into a foamed state, discharged from the milk foam nozzle 43 formed at a bottom surface of the milker, and supplied to the cup disposed under the nozzle 43.

Moreover, the milk foam and the extracted tea liquid supplied into the cup are mixed to manufacture the powdered green tea milk. In this case, it can be selected whether to pour the milk foam into the extraction vessel 31 prior to, simultaneously with or after the tea beverage. When the milk foam is first poured, so-called "latte" is manufactured. When the milk foam is poured later, so-called "au lait" is manufactured.

(4) Cleaning Operation

Next, the cleaning operation of the milk foamer 41 by use of the cleaning unit 5 will be described with reference to FIGS. 11 to 14. After the milk foam is produced as described above, a slight amount of the milk is attached to the inner surface of the suction tube 32, and remains. The miscellaneous germs propagate in this remaining milk with an elapse of time. Therefore, the microcomputer 66 counts the time elapsed from the previous production of the milk foam with a cleaning timer as a function of the microcomputer. For example, when 55 minutes elapses, the cleaning button LED 13A is first blinked in green. In consequence, a user is notified in advance that the suction tube 32 should be cleaned.

Subsequently, for example, after the elapse of five minutes, one hour (a predetermined time) in total elapses from the previous production of the milk foam (this predetermined time has a sufficient margin before occurrence of a danger that the miscellaneous germs propagate in the milk). In this case, the cleaning button LED 13A is lit (continuously lit) in orange this time. In consequence, the cleaning operation of the suction tube 32 by the cleaning unit 5 is instructed. Moreover, regardless of the instruction of the sales button, the microcomputer 66 prohibits the production of the milk foam by the milk foamer 41. It is to be noted that at this time, the manufacturing of the tea beverage or the coffee itself is successively possible.

Moreover, after or before confirming that the cleaning button LED 13A is lit in orange, the user extracts the suction tube 32 from the milk pack P, and inserts the end portion (the other end) of the suction tube on a weight member 106 side into the tube holder 127 to connect the tube to the holder. Moreover, the user introduces a predetermined amount of the cleaning liquid (the aqueous solution of hypochlorous acid) into the cleaning liquid tank 112, and long pushes the cleaning button 13. The microcomputer 66 then starts the cleaning operation. It is to be noted that, when the cleaning operation is started, the microcomputer 66 prohibits the manufacturing of the tea beverage or the coffee using the milk foam, and further blinks the cleaning button LED 13A in orange (the tea beverage or coffee in which any milk foam is not used can be sold).

Figure 11:
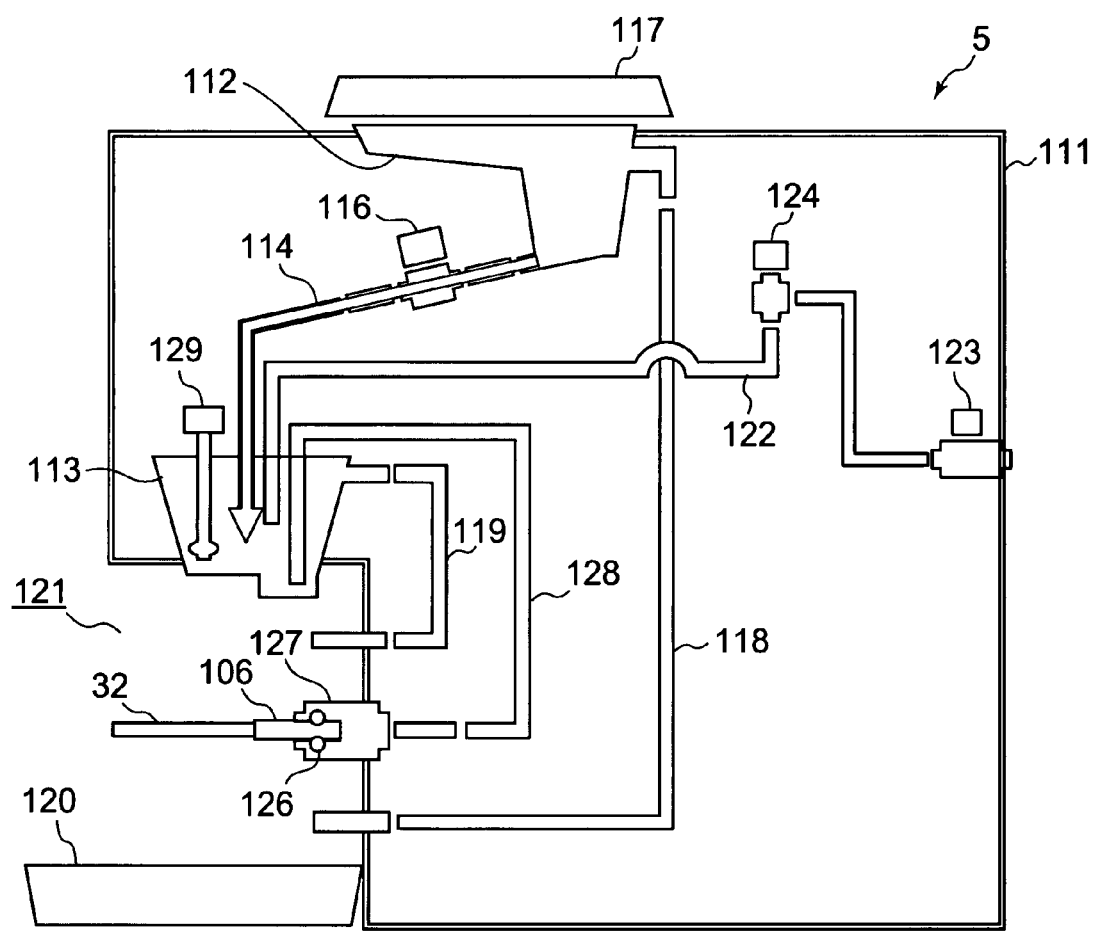
FIG. 11 is an explanatory view showing a cleaning operation of the cleaning unit of FIG. 7.

When the cleaning operation is started, the microcomputer 66 opens the cleaning liquid electromagnetic valve 116 to supply the cleaning liquid from the cleaning liquid tank 112 to the liquid storage tank 113 via the cleaning liquid pipe 114 (FIG. 11). Moreover, when the water level sensor 129 detects the full water level in the liquid storage tank 113, the microcomputer 66 closes the cleaning liquid electromagnetic valve 116. It is to be noted that, in a case where any change is not seen in the water level detected by the water level sensor 129 after the cleaning liquid electromagnetic valve 116 is opened (or after the cleaning operation is started), it is judged that the cleaning liquid tank is empty, and the microcomputer 66 is brought into a standby state. Moreover, in a case where there is not any change even after elapse of a certain time, the cleaning operation is stopped (in this case, predetermined error display is performed). In this case, at and after the standby state, the microcomputer 66 continues to prohibit the production of the milk foam and the manufacturing of the tea beverage or the like using the milk foam.

On the other hand, when the liquid storage tank 113 is filled with the cleaning liquid, the microcomputer 66 then operates the electromagnetic pump 14 for a predetermined time of, for example, 25 seconds. In consequence, the hot water stored in the hot water tank unit 8 is discharged into the hot water supply piping 101, and the discharged hot water enters the steam boiler 16. The hot water supplied into the steam boiler 16 is further heated by the steam boiler 16, and the temperature of the hot water is raised to, for example, +170° C. to generate the steam in the same manner as described above.

Figure 12:
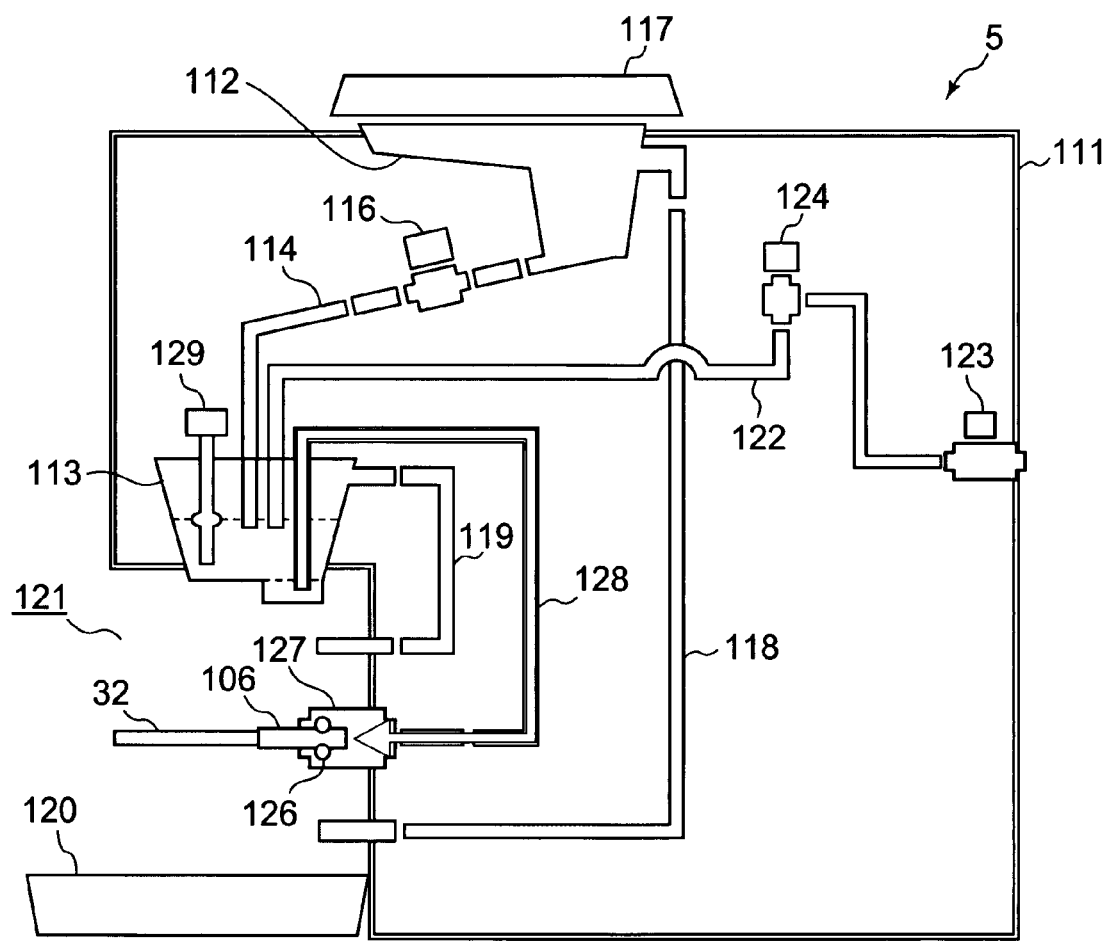
FIG. 12 is similarly an explanatory view showing the cleaning operation of the cleaning unit of FIG. 7.

Subsequently, the steam generated by the steam boiler 16 is jetted into the milker 18 from the hot water supply piping 101 connected to this steam boiler 16 on the downstream side. Here, when the steam passes through the vicinity of one end of the suction tube 32, the negative pressure is generated in the same manner as described above. Therefore, the cleaning liquid of the liquid storage tank 113 is sucked from the suction tube 32 via the suction pipe 128 (FIG. 12). Moreover, the sucked cleaning liquid is discharged into the milker 18 via the suction tube 32 to circulate through the milker, and then discharged from the milk foam nozzle 43. In consequence, the remaining milk attached to the inner surfaces of the suction tube 32, milker 18 and milk foam nozzle 43 is washed away, and the route extending from the suction tube 32 to the milker 18 and further to the milk foam nozzle 43 is cleaned to remove the germs.

The jetting of the steam by the steam boiler 16 is continued for a predetermined time, even after all of the cleaning liquid of the liquid storage tank 113 is sucked by the suction tube 32 to empty the tank. In consequence, the air is sucked into the route extending from the suction tube 32 to the milk foam nozzle 43 to blow the air. The cleaning liquid which is to remain on the inner surfaces is blown off.

Figure 13:
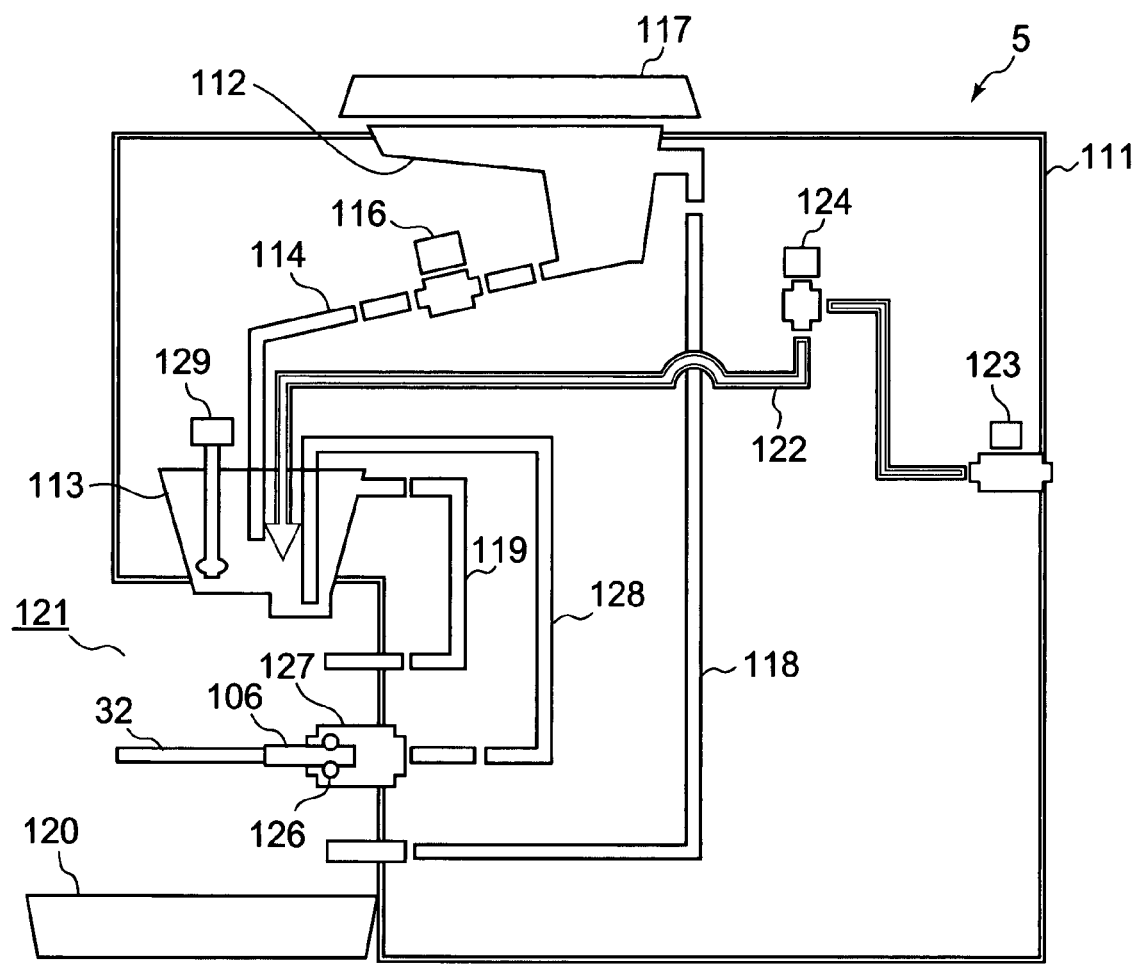
FIG. 13 is similarly an explanatory view showing the cleaning operation of the cleaning unit of FIG. 7.

After the cleaning with such a cleaning liquid and the air blowing are completed (after the elapse of one to two minutes from the start of the generation of the steam), the generation of the steam is once discontinued (or may successively be continued). Next, the microcomputer 66 opens the water supply electromagnetic valves 123, 124 to supply the rinsing water to the liquid storage tank 113 via the water supply pipe 122 (FIG. 13). Moreover, when the water level sensor 129 detects the full water level in the liquid storage tank 113, the microcomputer 66 closes the water supply electromagnetic valves 123, 124. It is to be noted that, in a case where there is not any change in the water level detected by the water level sensor 129 after the water supply electromagnetic valves 123, 124 are opened, it is judged that water supply is suspended, and the microcomputer 66 is brought into the standby state. Moreover, if there is not any change even after the elapse of the certain time, the cleaning operation is stopped (even in this case, the predetermined error display is performed). Even in this case, the microcomputer 66 successively continues to prohibit the production of the milk foam and the manufacturing of the tea beverage or the like using the milk foam (the tea beverage or the like in which any milk foam is not used can be sold).

On the other hand, when the liquid storage tank 113 is filled with the rinsing water, the microcomputer 66 next operates the electromagnetic pump 14 for a predetermined time of, for example, 25 seconds in the same manner as described above. In consequence, the hot water stored in the hot water tank unit 8 is discharged into the hot water supply piping 101. The discharged hot water enters the steam boiler 16. The hot water supplied into the steam boiler 16 is further heated by the steam boiler 16 to raise the temperature of the hot water to, for example, +170° C. in the same manner as described above, and the hot water is formed into the steam.

Figure 14:
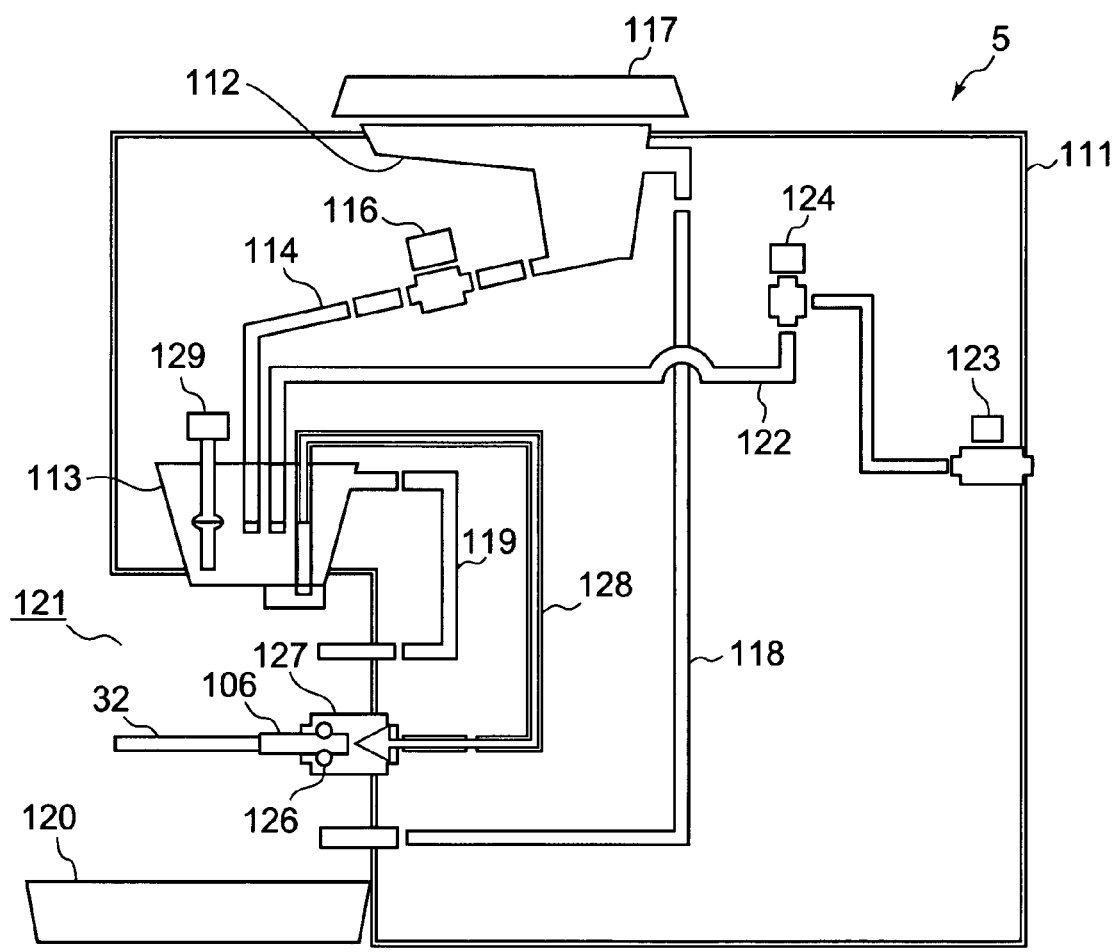
FIG. 14 is similarly an explanatory view showing the cleaning operation of the cleaning unit of FIG. 7.

Moreover, the steam generated by the steam boiler 16 is jetted into the milker 18 from the hot water supply piping 101 connected to this steam boiler 16 on the downstream side in the same manner as described above. When this steam passes through the vicinity of one end of the suction tube 32, the negative pressure is generated in the same manner as described above. Therefore, the rinsing water stored in the liquid storage tank 113 is sucked from the suction tube 32 via the suction pipe 128 (FIG. 14). Moreover, the sucked rinsing water is discharged into the milker 18 via the suction tube 32 to circulate through the milker, and then discharged from the milk foam nozzle 43. In consequence, the cleaning liquid attached to the inner surfaces of the suction tube 32, milker 18 and milk foam nozzle 43 is washed away, and the route extending from the suction tube 32 to the milker 18 and further to the milk foam nozzle 43 is cleanly rinsed.

The jetting of the steam by the steam boiler 16 is continued for a predetermined time, even after all of the rinsing water stored in the liquid storage tank 113 is sucked into the suction tube 32 to empty the tank. In consequence, the air is sucked into the route extending from the suction tube 32 to the milk foam nozzle 43 to blow the air. The rinsing water which is to remain on the inner surfaces is blown off. Therefore, a disadvantage that the rinsing water remains and the miscellaneous germs propagate is prevented.

After such rinsing is completed, the microcomputer 66 ends the cleaning operation, and cancels the prohibition of the manufacturing of the tea beverage or the coffee or the production of the milk foam. The cleaning button LED 13A turns off. The user disconnects the weight member 106 at the other end of the suction tube 32 from the tube holder 127, and inserts the member into the milk pack P again. In consequence, serving of the tea beverage or the like can subsequently be restarted without any trouble. In the embodiment, a time required for the cleaning operation is set to, for example, one minute to two minutes to shorten a beverage sales stop period.

It is to be noted that the numeric values of the time and the amount described in the embodiment are not limited to these values, and the values may appropriately be set to values suitable for the device. In the embodiment, the milk foamer of the present invention is applied to the beverage manufacturing device which manufactures the tea beverage and the coffee. However, needless to say, the device may produce and supply the only milk foam.

Moreover, in the embodiment, the cleaning liquid and the rinsing water are sucked by the steam boiler, but the present invention is not limited to the embodiment, and the cleaning liquid and the rinsing water may be sucked by means such as another pump. According to the embodiment, since the cleaning liquid and the rinsing water can be sucked using the steam boiler for the production of the milk foam, any special pump or the like is not necessary. The number of the components and costs can be reduced. Furthermore, in the embodiment, the aqueous solution of hypochlorous acid is introduced as the cleaning liquid into the cleaning liquid tank, but the present invention is not limited to the embodiment, and tap water similar to the rinsing water may be electrolyzed by electrodes in the cleaning liquid tank or halfway along the cleaning liquid pipe to generate hypochlorous acid.

Furthermore, in the embodiment, the execution of the cleaning operation is instructed with the cleaning button LED, but the present invention is not limited to the embodiment, and the instructing may be performed with sound of a buzzer or the like. In the embodiment, the user is forced to extract the suction tube from the milk pack to connect the tube to the tube holder of the cleaning unit, but the present invention is not limited to the embodiment, and channel switch means may be disposed halfway along the suction tube to automatically switch between a milk pack side and a cleaning unit side by the microcomputer. According to such a constitution of the embodiment, all regions of the suction tube can be cleaned. Moreover, a danger that the cleaning liquid and the like enter the milk pack side is eliminated.

What is claimed is:

1. A milk foamer which sucks milk from a milk storage section via a suction tube and which mixes the milk and air in a milker to produce milk foam, comprising:
    a control unit which controls the production of the milk foam; and
    a cleaning unit which executes a cleaning operation of a route extending from the suction tube to the milker,
    the control unit being configured to prohibit the production of the milk foam and instruct the cleaning unit to execute the cleaning operation, in a case where a predetermined time elapses from the previous production of the milk foam,
    wherein the control unit cancels the prohibition of the production of the milk foam after end of the cleaning operation by the cleaning unit,
    wherein the cleaning unit has a cleaning liquid storage section in which a predetermined cleaning liquid is stored, a connecting section which is connected to an end portion of the suction tube on a milk storage section side, and a suction pipe connected to the connecting section and to a bottom part of the cleaning liquid storage section, and during the cleaning operation, the control unit allows the cleaning liquid to be sucked into the suction tube from the cleaning liquid storage section of the cleaning unit in a state in which the end portion of the suction tube is connected to the connecting section.

2. The milk foamer according to claim 1, wherein during the cleaning operation, the control unit allows rinsing water to be sucked into the suction tube from the cleaning unit after the suction of the cleaning liquid.

3. The milk foamer according to claim 2, wherein during the cleaning operation, the control unit executes an operation of sucking the air into the suction tube after the suction of the cleaning liquid, or the cleaning liquid and the rinsing water.

4. The milk foamer according to claim 3, further comprising:
    a boiler which generates steam,
    the milk foamer being configured to suck the milk from the milk storage section via the suction tube by the steam generated by the boiler and to suck the cleaning liquid, or the cleaning liquid and the rinsing water into the suction tube from the cleaning unit by the steam generated by the boiler during the cleaning operation.

5. The milk foamer according to claim 1, wherein during the cleaning operation, the control unit executes an operation of sucking the air into the suction tube after the suction of the cleaning liquid, or the cleaning liquid and the rinsing water.

6. The milk foamer according to claim 5, further comprising:
   a boiler which generates steam,
   the milk foamer being configured to suck the milk from the milk storage section via the suction tube by the steam generated by the boiler and to suck the cleaning liquid, or the cleaning liquid and the rinsing water into the suction tube from the cleaning unit by the steam generated by the boiler during the cleaning operation.

7. The milk foamer according to claim 1, further comprising:
   a boiler which generates steam,
   the milk foamer being configured to suck the milk from the milk storage section via the suction tube by the steam generated by the boiler and to suck the cleaning liquid, or the cleaning liquid and the rinsing water into the suction tube from the cleaning unit by the steam generated by the boiler during the cleaning operation.

8. The milk foamer according to claim 2, further comprising:
   a boiler which generates steam,
   the milk foamer being configured to suck the milk from the milk storage section via the suction tube by the steam generated by the boiler and to suck the cleaning liquid, or the cleaning liquid and the rinsing water into the suction tube from the cleaning unit by the steam generated by the boiler during the cleaning operation.

9. A milk foamer which sucks milk from a milk storage section via a suction tube and which mixes the milk and air in a milker to produce milk foam, comprising:
   a control unit which controls the production of the milk foam; and
   a cleaning unit which executes a cleaning operation of a route extending from the suction tube to the milker,
   the control unit being configured to prohibit the production of the milk foam and instruct the cleaning unit to execute the cleaning operation, in a case where a predetermined time elapses from the previous production of the milk foam,
   wherein the cleaning unit has a cleaning liquid storage section in which a predetermined cleaning liquid is stored, a connecting section which is connected to an end portion of the suction tube on a milk storage section side, and a suction pipe connected to the connecting section and to a bottom part of the cleaning liquid storage section, and during the cleaning operation, the control unit allows the cleaning liquid to be sucked into the suction tube from the cleaning liquid storage section of the cleaning unit in a state in which the end portion of the suction tube is connected to the connecting section.

10. The milk foamer according to claim 9, wherein during the cleaning operation, the control unit allows rinsing water to be sucked into the suction tube from the cleaning unit after the suction of the cleaning liquid.

11. The milk foamer according to claim 10, wherein during the cleaning operation, the control unit executes an operation of sucking the air into the suction tube after the suction of the cleaning liquid, or the cleaning liquid and the rinsing water.

12. The milk foamer according to claim 11, further comprising:
   a boiler which generates steam,
   the milk foamer being configured to suck the milk from the milk storage section via the suction tube by the steam generated by the boiler and to suck the cleaning liquid, or the cleaning liquid and the rinsing water into the suction tube from the cleaning unit by the steam generated by the boiler during the cleaning operation.

* * * * *